United States Patent [19]
Scott, III

[11] Patent Number: 6,157,007
[45] Date of Patent: Dec. 5, 2000

[54] CHAFING DISH HEATER

[75] Inventor: Chester B. Scott, III, Mentor, Ohio

[73] Assignee: Chesterfield Products, Inc., Mentor, Ohio

[21] Appl. No.: 09/479,174

[22] Filed: Jan. 7, 2000

Related U.S. Application Data

[60] Provisional application No. 60/115,103, Jan. 8, 1999.

[51] Int. Cl.[7] .............................. H05B 3/78; A47J 36/24
[52] U.S. Cl. ........................ 219/437; 219/430; 219/432; 392/501
[58] Field of Search .................................. 219/429, 430, 219/432, 437; 392/501

[56] References Cited

U.S. PATENT DOCUMENTS

| | | | |
|---|---|---|---|
| 1,697,723 | 1/1929 | Newland | 392/497 |
| 1,994,909 | 3/1935 | Ehrgott | 219/437 |
| 2,471,259 | 5/1949 | Chapman | 392/498 |
| 2,576,688 | 11/1951 | Landgraf | 392/498 |
| 2,756,425 | 7/1956 | Webber | 219/437 |
| 3,476,915 | 11/1969 | Rapsis | 392/448 |
| 3,797,563 | 3/1974 | Hoffmann et al. | 219/387 |
| 3,971,307 | 7/1976 | Graham | 99/403 |
| 5,045,672 | 9/1991 | Scott | 219/439 |
| 5,990,455 | 11/1999 | Scott | 219/430 |

*Primary Examiner*—Joseph Pelham
*Attorney, Agent, or Firm*—Watts Hoffmann Fisher & Heinke Co LPA

[57] ABSTRACT

An improved heater assembly for use with a chafing dish having water and food pans with complemental peripheral flanges is disclosed. The assembly includes a corner piece sized to be interposed between such flanges to maintain at least portions of such flanges in spaced relationship when the chafing dish is in use. The assembly also includes an immersible heater element sub-assembly including an upstanding arm connected to and depending from the corner piece. The sub-assembly including an encased electrical resistance heater loop having end portions connected to the arm with the arm and loop being sized to position the loop near a bottom of such water pan and immersed in water when such chafing dish is in use. Side and end arms are connected to the corner piece and adapted to be positioned respectively between side and end portions of such peripheral flanges. The spacer arms are each of thickness from a thick portion near the corner portion to a thinner remote end portion.

5 Claims, 3 Drawing Sheets

CHAFING DISH HEATER

This application claims benefit to provisional application 60/115,103 filed Jan. 8, 1999.

This invention relates to chafing dishes and more specifically to a novel and improved electrical heater assembly for chafing dishes for producing desired water vapor conditions to maintain foods at temperatures appropriate for serving.

BACKGROUND OF THE INVENTION

Chafing dishes are widely used for buffet type food service, serving hors d'oeuvres, and other purposes. Such chafing dishes typically include a water pan supported by a leg and a bracing structure. A heat source is used to heat the water in the water pan. A food pan is supported by the water pan above the level of the water.

In most instances flames from canned fuels are used as the heat source. Other chafing dishes have been proposed which use electrical heaters rather than flames to heat the water. But, the known electrically heated chafing dishes also have drawbacks. Some prior electric heater elements project through holes in the water pan to provide terminals for connection to a power source. These holes obviously must be sealed and are themselves a source of service trouble.

Heater elements which are physically connected to the water pan with portions of the elements projecting through holes in the water pan, are difficult to clean. Since they are difficult to clean the elements tend to suffer from scale build-up which reduces efficiency and degrades the performance of the unit.

Other prior proposals placed electric heating elements beneath the water pan. These proposals required support structure adding significantly to complexity and cost.

With canned fuels, the fuel is either an alcohol base material or an oil and wick arrangement. The alcohol materials tend to vapor lock so that flame size varies and produces uneven heat. Diaphragms are sometimes provided that are adjustable to control the size of the flame and with it hopefully the amount of heat produced. The problem with these diaphragms is that with the tendency of the alcohol type fuel to vaporize, the flame is often extinguished.

With wick and oil heat sources, the only ability to control the temperature of the flame is by spreading of the wick to increase the size of the flame. Thus, at best there is very limited control of temperature using a flame arrangement.

Canned heat sources are costly and wasteful. Typically after a food service the cans which have been used will be disposed of and new cans will be used at a subsequent service to be sure that there is adequate fuel at the subsequent service. Moreover, cans of fuel typically must be bought in quantity which ties up both capital and storage space.

The chafing dish described and claimed in U.S. Pat. No. 5,045,672 issued Sep. 3, 1991 (the Prior Patent) was very favorably received in test installations, but it had one major drawback. Specifically, it was necessary to provide either specialized water or food pans notched to receive a heating element.

The shortcomings of the prior art have been substantially overcome through the device taught and claimed in application Ser. No. 09/065,162 filed Apr. 23, 1998 under the title "Chafing Dish", now U.S. Pat. No. 5,990,455 granted Nov. 23, 1999. The '455 Patent discloses a rectangular spacer interposed between flanges of water and food pans with the spacer surrounding the body of the food pan. The flange is composed of four elongate linear elements joined by four corner elements with one of the corner elements being a heater support forming a part of a heater assembly. The assembly includes members which depend from the heater support including a tube mechanism encasing leads and a heater element. The heater element and a section of the tube mechanism are preferably in loop form for positioning near the bottom of a water pan. A temperature sensitive switch is encased within the tube mechanism and connected to the heater for interrupting a supply of electricity to the heater when an overheated condition exists such as when a water pan has gone dry.

While the structure of the copending application has been an immense improvement and enjoyed some amount of success, some users have objected to the multiple parts of the structure for spacing flanges of food and water pans. Specifically, the parts require assembly and disassembly and there is risk of loss of some of the component parts.

SUMMARY OF THE INVENTION

An improved heater assembly has been devised in which there is but one corner element and two flange spacers. The corner element carries leads for the immersible heater. The flange spacers are pivotally connected to the corner element. The pivots are for movement between a storage position in which the spacers are parallel and generally aligned longitudinally with longitudinal runs of a tube encasing the heater element and an in use orientation in which they are orthogonal to one another.

The spacers are of differing lengths so that one when in use functions as a spacer between end portions of water and food pan flanges, while the other spacer is between side portions of the pan flanges. The spacers taper from a dimension substantially equal to the thickness of the corner element to thin end portions remote from the corner element.

It has been found that with the new construction either the side or end pan flange portions remote from the spacers are in substantial abutment and very nominal spacing occurs between the other flange portions such that any gap between the pan flanges normally allows no more water vapor to escape than has occurred with prior art pans. This is especially true after pans have been in use for some period of time with the resultant distortions in shape that use invariably produces.

Accordingly, the object of the invention is to provide a novel and improved chafing dish electric heater assembly.

DESCRIPTION OF THE PREFERRED EMBODIMENT

Figure 1:
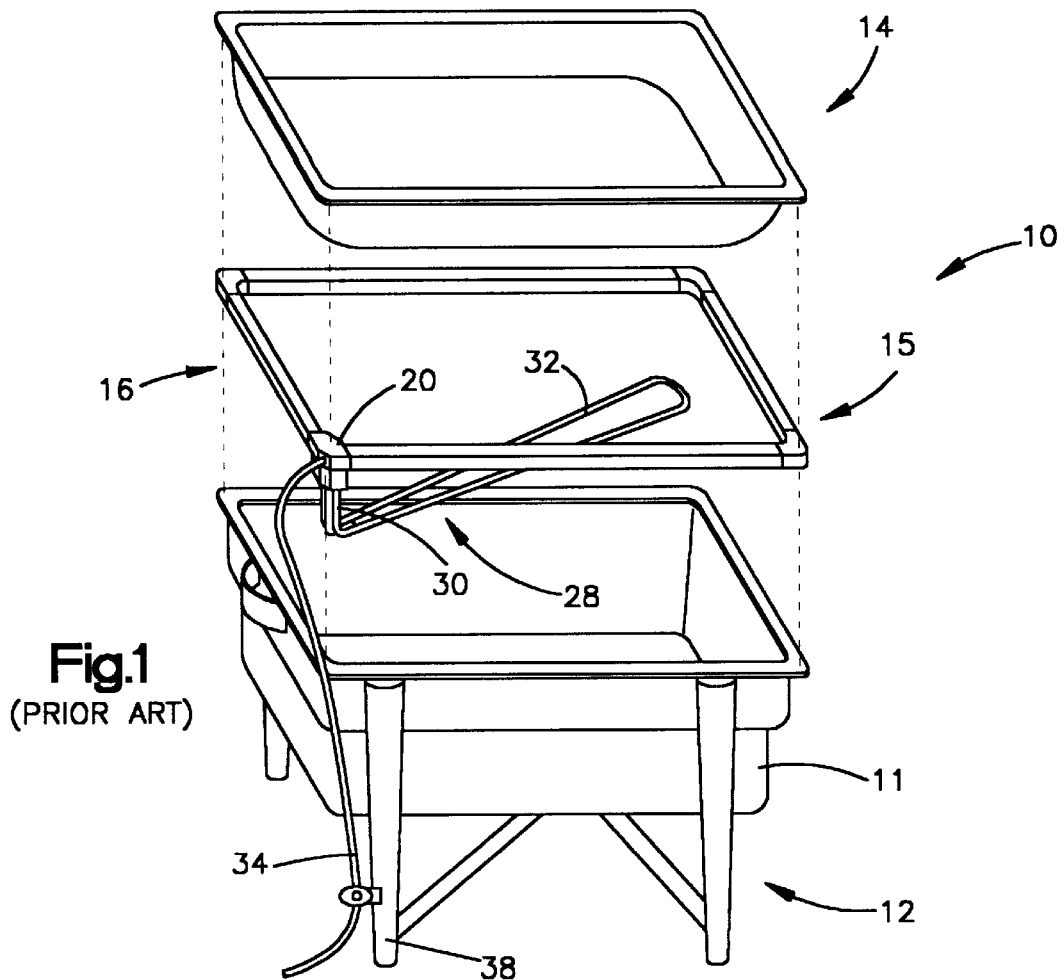
FIG. 1 is an exploded view of a chafing dish and the heater assembly of the '455 Patent.

Referring now to the drawings and FIG. 1 in particular, a chafing dish of the '455 Patent is shown generally at 10. The dish includes a water pan 11, support structure shown generally at 12 and a food pan 14. The water pan and support structure and the food pan 11, 12, 14 may be any of the many commercially available chafing dish pans and supports.

The heater structure of the '455 Patent is shown generally at 15. The heater structure includes a spacer 16. The spacer 16 includes three identical corner elements 18 and a heater support corner element 20. Elongate linear side and end elements 22, 24 are joined together by the corner elements to form the spacer 16.

Each of the corner elements 18, 20 includes projecting tabs 25 sized to project into end recesses, not shown, at the opposite ends of each of the side and end elements. The tabs 25 are preferably bonded to the side and end elements as by an adhesive. Shoulders of the corner elements abut ends of the side and end elements, as indicated at 26 to form the open rectangular spacer 16 as shown in FIG. 1.

A tube mechanism shown generally at 28 is provided. The tube mechanisms includes a depending section 30 and a loop section 32. The loop section encases a resistance heater element, not shown, while the depending section 30 houses leads connecting a power supply cord 34 to the heater element. The tube mechanism 28 includes a switch encasing section 35 housing a bimetallic switch, not shown. The switch is connected to the leads in series with the heater element. The switch is normally closed, but opens when an excessive heat condition is sensed to interrupt the supply of current to the heater element, such as when the water pan 12 has run dry.

A clip 36 removably fastens the supply cord 34 to a leg 38 of the dish support structure 12 to protect against the cord 34 being pulled from the heater support corner element 20.

Figure 2:
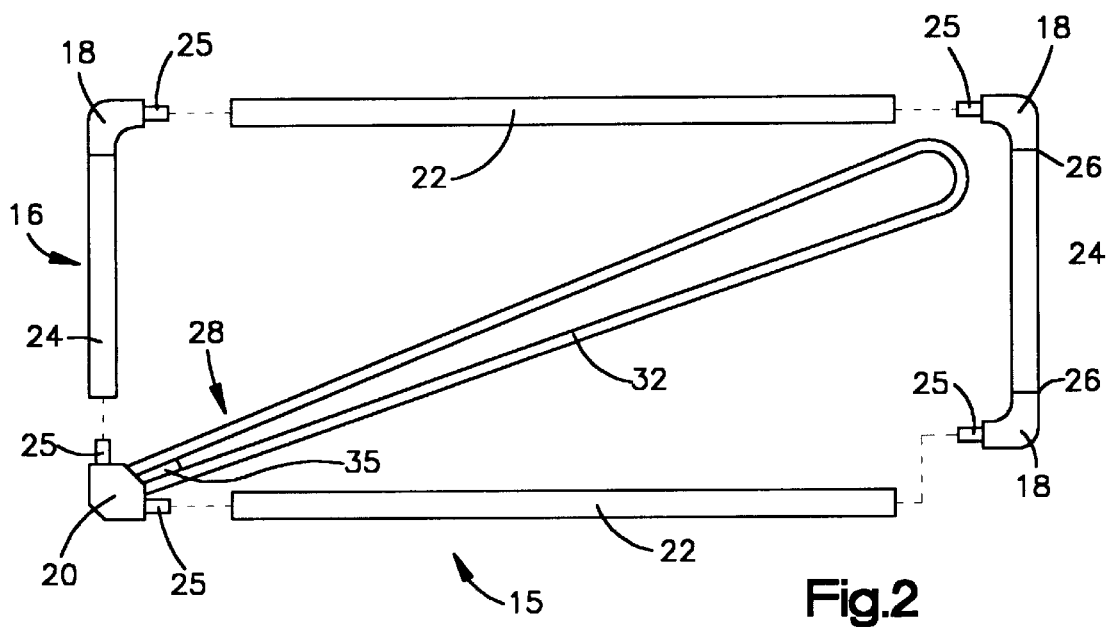
FIG. 2 is a plan exploded view of the heater assembly of FIG. 1.
Figure 3:
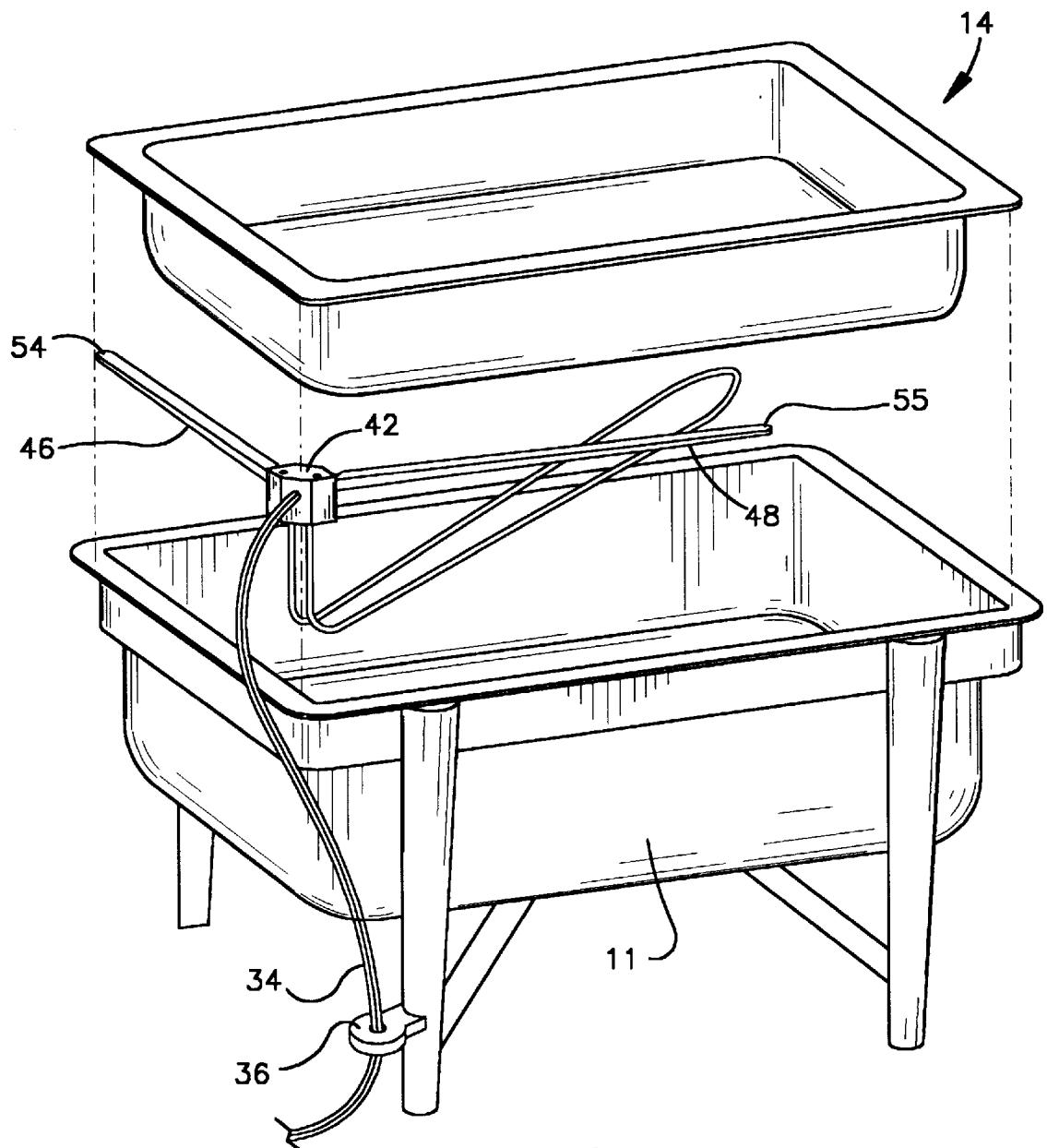
FIG. 3 is a perspective and exploded view of a chafing dish equipped with the improved heater assembly of the present invention.
Figure 4:
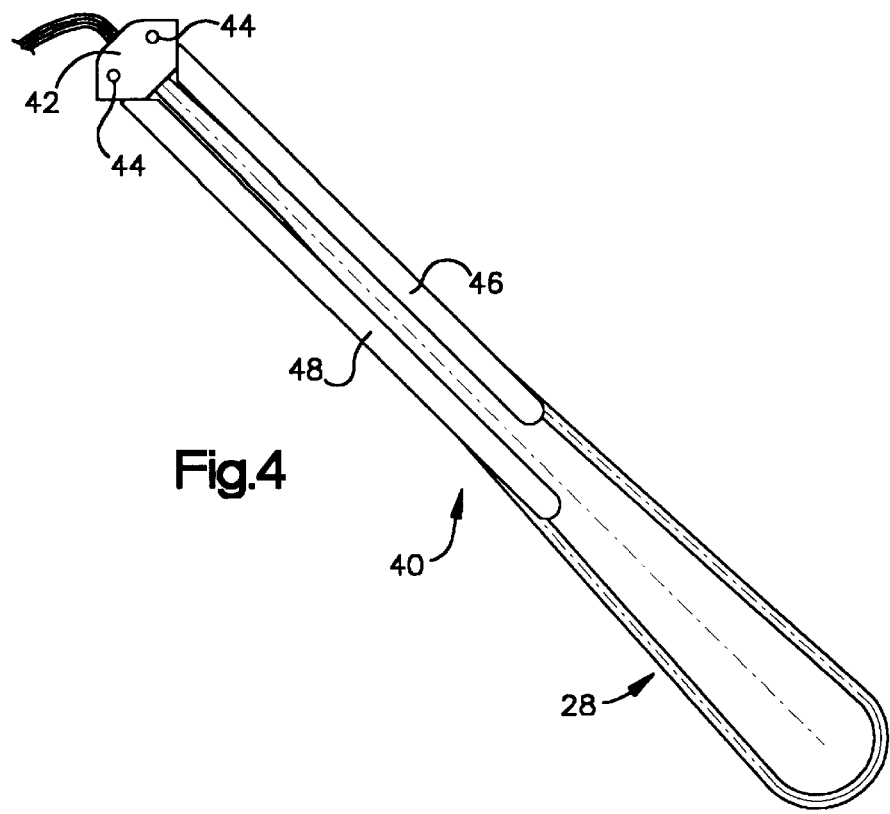
FIG. 4 is a plan view of the improved heater assembly with the spacers in their use positions; and, FIG. 5 is a perspective view of the heater assembly of FIGS. 3 and 4 with the spacers in their storage positions.
Figure 5:
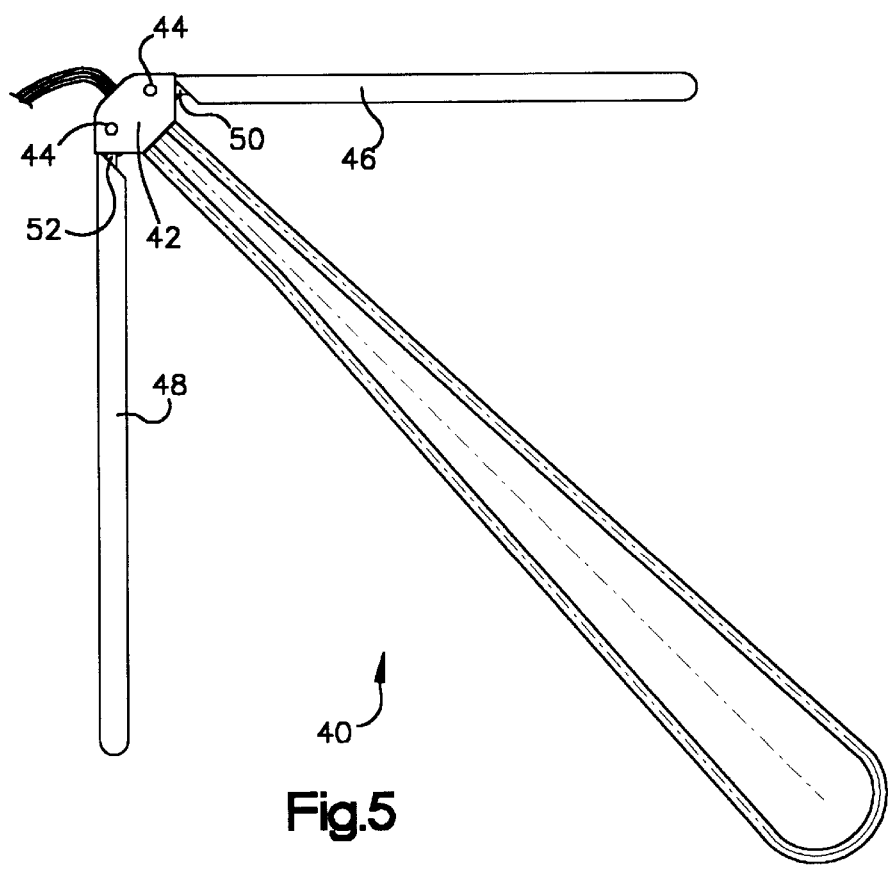

Referring now to FIGS. 3 to 5, the improved heater assembly is shown generally at 40. The assembly includes the tube 28, encased heater and associated parts which are the same as those of FIGS. 1–3. A corner piece 42 is provided that is structurally similar to the corner piece 20. The difference between the corner pieces 20 and 42 are that the tabs 25 are eliminated and pivots 44 are provided in the corner piece 42. End and side flange spacers 46, 48 are connected to the corner piece 42 by the pivots 44. The spacers 46, 48 respectively include pivot extensions 50, 52 (FIG. 5) which project into spaces in the corner piece 42 and are connected to the pivots 44 to secure the spacers to the corner piece.

As is best in FIG. 3, each of the flange spacers tapers from a thick end portion adjacent the corner piece to a respective one of thin end portions 54, 55 remote from the corner piece. The thick end portions are of substantially the same thickness dimension as the corner piece.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention.

What is claimed is:

1. For use with a chafing dish having water and food pans with complemental peripheral flanges an improved heater assembly comprising:
    a) a spacer including a corner piece sized to be interposed between such flanges to maintain at least portions of such flanges in spaced relationship when such chafing dish is in use;
    b) an immersible heater element sub-assembly including an upstanding arm connected to and depending from the corner piece when is use;
    c) the sub-assembly including an encased electrical resistance heater unit, the unit being a loop having end portions connected to the arm with the arm and loop being sized to position the loop near a bottom of such water pan and immersed in water when such chafing dish is in use;
    d) the spacer also including side and end spacer arms are connected to the corner piece and adapted to be positioned respectively between side and end portions of such peripheral flanges; and,
    e) the spacer arms are each being of tapering thickness from a thick portion near the corner portion to a thinner remote end portion.

2. The assembly of claim 1 wherein the spacer arms are pivotally connected to the corner piece and moveable between a storage position wherein the arms and loop are generally parallel to one another and a use position wherein the arms are generally perpendicular to one another.

3. For use in heating water in a chafing dish water pan to thereby warm food in a supported food pan, an improved heater assembly comprising;
    a) a corner piece for positioning between perimetial portions of such pans;
    b) a heating loop connect to the corner piece and adapted to be positioned within such a water pan;
    c) end and side spacer arms each including an end mounting section pivotally connected to the corner piece;
    d) the spacer arms being shiftable between a storage position wherein the spacers are generally parallel to one another and a use position wherein the spacers are generally perpendicular to one another.

4. The assembly of claim 3 wherein the spacers each taper from a thickest porition near the corner piece to a thinner remote end porition.

5. The assembly of claim 3 wherein the spacers each include a reduced size and section projecting into an associated mounting recess in the corner piece.

\* \* \* \* \*